July 10, 1951             P. W. JOHNSON             2,559,771
GAUGE OF PIVOTED GAUGE MEMBER
TYPE WITH END INDICATOR
Filed Jan. 27, 1949
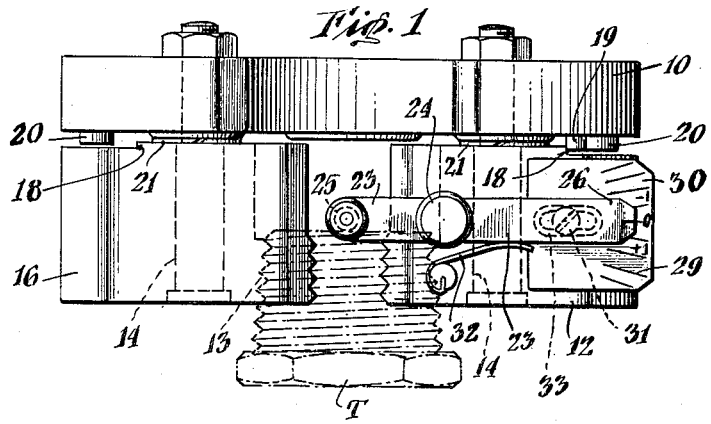
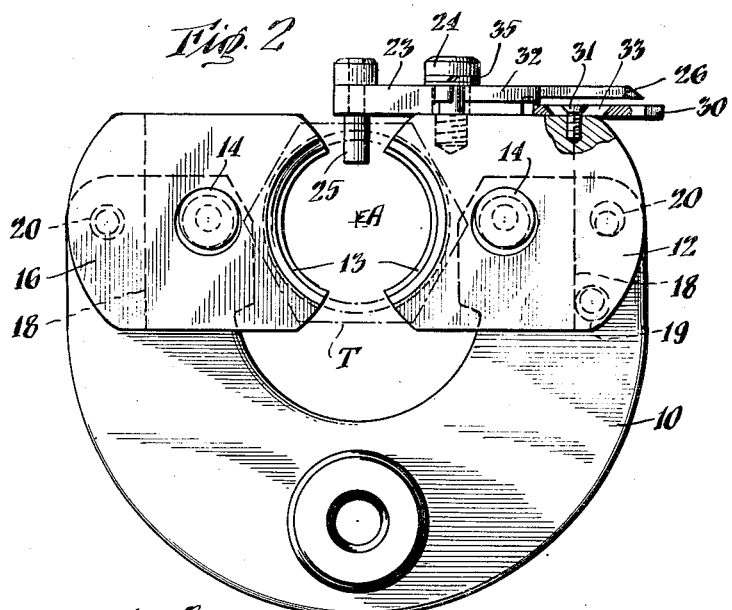
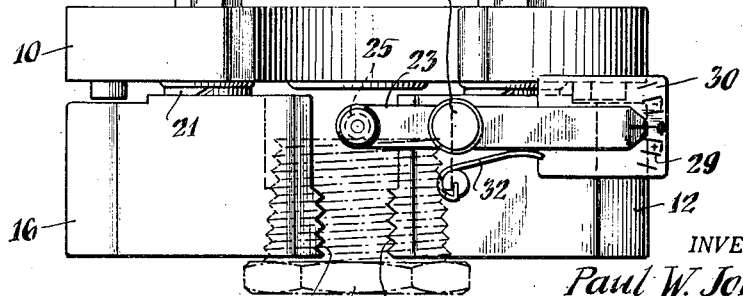
INVENTOR.
Paul W. Johnson
BY
Bohleber, Fasatt + Montstream
ATTORNEYS Patented July 10, 1951

2,559,771

UNITED STATES PATENT OFFICE 2,559,771

GAUGE OF PIVOTED GAUGE MEMBER TYPE WITH END INDICATOR

Paul W. Johnson, Bloomfield, Conn.

Application January 27, 1949, Serial No. 73,104

6 Claims. (Cl. 33—199)

The invention relates to a gage of the snap type, that is a type in which the test part is presented laterally to the gage or gage members, for gaging circular test parts and more particularly those having a spiral groove or ridge in the periphery thereof. The gage has particular applicability in the gaging of screw threads of both the straight and taper form, however, the gage finds its greatest usefulness, in connection with the gaging of taper threads.

It is an object of the invention to construct a new and novel gage of the snap type and which engages the test part at a plurality of points around the periphery thereof and which includes new and novel means for testing an axial dimension of the test part.

Another object of the invention is to construct a gage of the snap type which engages a plurality of points around the periphery of the gage and which mounts a pivoted lever upon a pivoted gage member for engaging the end of the test part and thereby determining an axial dimension thereof.

A still further object of the invention is to construct a taper gage of the type having a pivoted segment or gage member carrying gaging means which engages a plurality of points around the periphery of the test part and carries a pivoted lever which engages the end of the test part so that the size of taper may be determined thereby.

Other objects of the invention will be more apparent from the following description when taken in connection with the accompanying drawings showing a preferred embodiment thereof in which:

Figure 1 is a plan view of the gage with a tapered test part therein shown in dot-dash lines.

Figure 2 is a side elevation of the gage.

Figure 3 is a top elevation of a similar gage but having gage members which are of larger diameter to engage a larger diameter of a taper test part.

The gage includes a frame 10 of any suitable construction, that shown being of general U-shaped form which provides two spaced arms. Each arm carries a gage member as will be described.

A gage member is carried by each arm, each gage member cooperating with the other in the gaging operation. At least one gage member may be pivotally mounted although in the preferred form illustrated, both gage members are pivotally mounted. It is not essential that both gage members be of this type.

The gage member 12 has a gaging means which engages a test part at a plurality of points around the periphery thereof. The gaging means particularly illustrated is a concave gaging means 13 continuously engaging a substantial extent of the semi circumferential periphery of the test part although the gaging means may be of a form which engages the test part at a minimum of two spaced points around the periphery thereof. The gage member is mounted for pivotal movement upon suitable mounting means, that shown including a pivot pin or stud 14 which preferably is adjustable but is normally fixed to the frame when the gage is in use. The adjusting construction particularly shown is an eccentric pivot pin or stud, several forms of which are well known. For a taper thread, the threaded portion of the gaging means 13 may engage a few threads only and this is particularly true when the taper is to be tested as will appear more fully hereinafter.

A cooperating gage member 16 is provided, which preferably is of the same pivoted type as the gage member 12 although this is not essential and in fact this gage member need engage the test part at one point only in its periphery. A more adequate test is made if the cooperating gage member is like the gage member 12 and engages a test part at a plurality of points around the periphery thereof.

The gaging means 13 may be plain surfaced or may have a spiral groove or ridge therein or may carry screw threads for engaging a threaded test part. The gaging surface may be axially straight or tapered and likewise if threaded, the thread may be of the straight or taper form although the gage was constructed primarily for taper threaded test parts. The pivoted gage members 12 and 16 pivot upwardly so that the pair of gaging means 13 open up for the insertion of a test part therein. The test part is then inserted into the open concave gaging means and by moving the test part downwardly the gage members swing toward each other to close the gaging means upon the test part to engage or embrace the same. It will be noted that the pivotal mounting means 14 for the gage member 12 is fixed to the frame at a point spaced from the axis A of the gaging means 13. The pivot pin 14 is also located so that the axis A of the gaging means lies between the cooperating or second gage member 16 and the pivotal supporting means 14 for the first gage member with the gaging means 13 facing radially outwardly from the pivot 14. The gage member 12 or particularly the gaging means, therefore, pivots toward and away from the second gage member 16 into gaging position upon a circular path which is radially spaced from the second gage member 16 whereby the gage member does not come into contact with but sweeps tangentially past the cooperating gage member. Gaging position therefore is at or approximately on a line connecting the centers or axes of the pivotal mounting means 14 for the two cooperating gage members.

For a cylindrical test part the gaging member may be stopped or halted in its or their pivotal movement by the gaging means gripping the test part. For a conical or tapered test part, however, means are provided to halt the swinging movement of a pivoted gage member, such as the gage member 12, so that it does not swing downwardly beyond gaging position. This stop means is preferably used also for cylindrical test parts. This means may take numerous forms, that particularly illustrated including a shoulder 18 carried by the gage member and a stop pin 19 carried by the frame. This stop pin is adjustable so that the gage member will be retained or stopped in gaging position irrespective of what adjustment is made of the adjustable pivotal mounting means 14 as well as to accommodate for manufacturing variations in the position of the shoulder. An eccentric pin is shown as a desirable adjustable stop means.

Means may also be provided such as the limiting stop pins 20 for limiting the extent of pivotal movement of the gage members. These stop pins are spaced from the shoulder 18 when the gage member are in gaging position and are engaged by the shoulder 18 when the gage members are pivoted away from gaging position. They may be eccentric or adjustable pins.

The pivotal gage member or members may be impelled to opened position or to closed position or may have a drag provided therewith so that they remain in whatever position in which they are released. The means for accomplishing these results are known and constitute no part of this invention. One such means, however, is desirable in the practical operation and use of the gage herein which is a spring drag washer 21.

The pivoted gage member carries means for indicating the position of the end of a test part. This means includes a lever 23 pivotally mounted upon the pivotal gage member 12 by means of a pivot pin or screw 24 the axis of which is essentially perpendicular to the axis of the pivotal mounting stud 14 for the gage member. The lever is in a position to be engaged by the end of the test part when the latter is in gaging position which result is secured by an extension 25, at the end of the lever, which is shown as a separate pin carried by the lever. The end of the lever is movable axially of the test part.

Means of any suitable character is used to indicate the position of the end of the test part or the angular position of the lever. The simplest form of indicator includes a pointer 26 forming a part of the lever and indicia 29 carried by the gage member 12. These indicia may be directly on the gage member although it is more convenient to place them upon a separate indicia plate 30 which is secured to the gage member such as by a screw 31 engaging in a slot 33 which permits adjustment of the indicia plate. In some cases the lever may be impelled toward the end of the test part which may be accomplished by means of a spring such as the leaf spring 32. For certain gaging operations, as will be described hereinafter, the lever instead may have a drag placed thereupon such as by a spring washer 35 so that it remains in the position in which it happens to be or to which it is moved.

In gaging, a test part is inserted into the gaging means 13 and moved laterally thereinto, which swings the gage member to gaging position whereupon the stop 19 engages the shoulder 18 to restrain or limit the movement of the gage member 12 to gaging position. If the cooperating gage member 16 is a similar pivoted gage member it too stops or is retained in gaging position by virtue of its engagement of the test part. The test part is then moved axially and if threaded, grooved or ridged, rotated so that the spiral groove or ridge or thread moves the test part T axially into the gaging means 13 of the gage members. The test part is turned or moved axially until it is halted, such as by a shoulder engaging the faces of the gage members or in case of a tapered thread until the taper thread binds or comes to rest within the gaging means. The end of the test part engages the extension 25 of the lever 23 and swings the same and a comparative reading of the angularity of the lever and hence of the axial position of the end of the test part with respect to a master test part, can be made on the indicia 29.

In the case of a straight thread or a smooth surface test part, an indication of the comparative dimension with a master test part between a shoulder and the end of the test part is secured. In the case of a tapered part or thread an indication is received as to the relative diameter of the taper with respect to a master test part. In other words an undersize dimension of taper will project the test part farther into the gaging means and swing the lever to a greater extent in a clockwise direction. A test part having a taper slightly larger than a properly dimensioned part will not be projected as far axially within the gaging means and the lever 23 will not swing as far and an indication thereof is secured by the pointer 26 on the indicia 29. Since the distance between the end of the pointer 26 and the pivot 24 is twice that of the distance between the center of the pin 24 and the extension 25, there is a two to one magnification in the indication or reading as to the position of the end of the test part when it comes to rest within the gaging means.

With a taper thread or a smooth surface taper part it may be desirable to obtain an indication as to the angle of the taper. In other words a test part may have a proper diameter at the end thereof in which case the gage would indicate a satisfactory test part when as a matter of fact the taper may be faulty so that at the large diameter end of the taper part the dimension may be too small or too great. The reverse situation may also exist in that the end of the taper test part may show as being small or large when as a matter of fact the larger diameter may be proper size.

In order to reveal the above condition, two sets of gage members are provided upon the same frame or each upon a separate frame or frame means but adjacent to each other. Two such gages are shown in Figures 1 and 3. In the gage of Figure 3 the gaging means 13 of the gage members are larger so that the gaging means will engage the larger diameter portion of the thread or taper. For this kind of test it is preferable not to use a spring 32 for propelling the lever 26 but a drag means such as a spring washer 35 alone is utilized for each gage. For each gaging operation upon the gage of Figure 1 and the gage of Figure 3 the lever 23 is moved manually toward the outer end of the gage members. A test part is inserted and moved axially or if threaded is rotated for axial movement until the taper prevents further axial movement of the test part within the gaging means. A reading of the position of the lever 23 or pointer 26 is then taken or preferably it is allowed to remain in tested position. The test part is then removed and inserted in the gage of Figure 3 and when in gaging position the test part is moved axially until axial movement is prevented by the taper and the reading of the position of the lever or pointer is made. If the reading in both gaging operations is the same, namely, 00, —1—1 +1+1 etc., then it is known that the taper is of proper angularity and that the diameter is respectively correct, slightly oversize or slightly undersize. It is only when the reading from each gaging operation is different, for example 01, +1—1 etc., that an improper angle for the taper is indicated. It is for this reason that each gage has a lever with a drag means or spring washer 35 since it is desirable to leave the lever in its gaging position for each part so that the indication of a reading on the gage of Figure 1 may be compared with an indication of the gaging operation on Figure 3. It is after this reading or indicating of the two gaging operations is performed that the levers are then swung counter-clockwise into position for a second testing operation.

The invention is presented to fill a need for improvement in a gage of pivoted gage member type with end indicator. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, a gage member having a gaging means which engages a test part at a plurality of points around the outer periphery thereof, a second gage member cooperating with the first gage member, means carried by the frame for pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gaging member pivots towards and away from the second gaging member into and out of gaging position upon a circular path radially spaced from the second gage member, a pivoted lever carried by a pivoted gaging member having an end thereof positioned to engage the end of a test part embraced within the gaging means when in gaging position and the end of the lever being movable in an axial direction with respect to the axis of the gaging means, and indicating means indicating the angular position of the lever.

2. A gage as in claim 1 in which the indicating means includes a pointer carried by the lever, and indicia carried by the pivoted gage member.

3. A gage as in claim 1 including stop means for at least one pivoted gage member and engaging the same to stop the gage member in gaging position.

4. A gage as in claim 1 in which the gaging means is a taper thread, means for at least one pivoted gage member and engaging the same to stop the gage member in gaging position, and drag means for the pivoted lever to retain the same in its moved position.

5. A gage combination comprising a frame means, a pair of gaging sets each including a first gage member having a taper gaging means which engages a test part at a plurality of points around the outer periphery thereof, a second gage member cooperating with the first gage member, means carried by the frame means for pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gaging member pivots towards and away from the second gaging member into and out of gaging position upon a circular path radially spaced from the second gage member, a pivoted lever carried by a pivoted gaging member having an end thereof positioned to engage the end of a test part embraced within the gaging means when in gaging position and movable in an axial direction with respect to the axis of the gaging means, indicating means indicating the angular position of the lever, and the gaging means for one set of gage members having a dimension to engage one end of the tapered test part and the gaging means for the other set of gage members having a dimension to engage the other end of the tapered test part.

6. A gage combination as in claim 5 in which drag means engages each lever to retain the same in adjusted position.

PAUL W. JOHNSON.

REFERENCES CITED

The following references are of record in the file of this patent:

UNITED STATES PATENTS

| Number | Name | Date |
| --- | --- | --- |
| 2,027,217 | Zerkle | Jan. 7, 1936 |
| 2,433,516 | Johnson | Dec. 30, 1947 |
| 2,435,268 | Childs | Feb. 3, 1948 |
| 2,437,160 | Johnson | Mar. 2, 1948 |